UNITED STATES PATENT OFFICE.

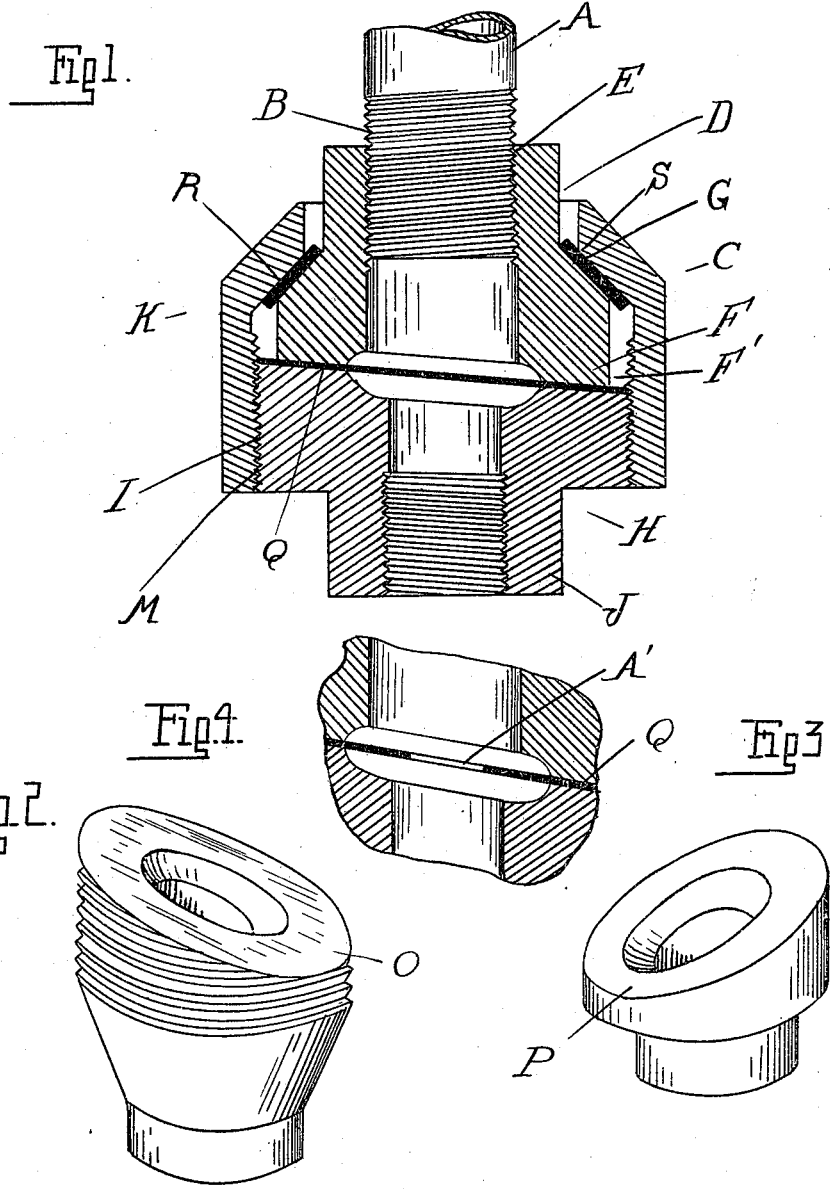

ANDREW McLEAN, OF DETROIT, MICHIGAN.

INSULATION-JOINT.

960,377.　　　　　Specification of Letters Patent.　　Patented June 7, 1910.

Application filed June 11, 1909. Serial No. 501,624.

*To all whom it may concern:*

Be it known that I, ANDREW MCLEAN, a subject of the King of Great Britain and Ireland, residing at Detroit, in the county of Wayne and State of Michigan, have invented certain new and useful Improvements in Insulation-Joints, of which the following is a specification, reference being had therein to the accompanying drawings.

The invention relates to insulation joints or couplings for use in connection with electric or combination fixtures, and designed especially for uniting the fixtures to either the ordinary gas pipe of the house, or, in straight electric work, to a special metallic conduit, and it consists in the novel and simple construction of the coupling or joint, in the peculiar arrangement and combination of its parts, and in certain details of construction, as will be hereinafter pointed out.

In the drawings,—Figure 1 is a vertical central section through an insulation joint or coupling embodying my invention; Figs. 2 and 3 are detached perspective views of the coupling members; and Fig. 4 is a sectional view, showing a modified form of coupling.

In Figs. 1 to 3 inclusive a construction of coupling is shown especially designed for what is generally termed "straight electric work." In these figures, the reference-letter A designates the projecting portion of an ordinary gas pipe, having an externally threaded end B.

C represents the coupling in its entirety, screwed upon the pipe end, as shown, and having a threaded bearing at its lower end adapted to engage the pipe of the fixture, or, if desired, a hook-carrying plug on which a chain or other similar device may be placed.

In construction, the coupling comprises a tubular section D internally screw-threaded, as at E, to engage the pipe, formed with a cylindrical head F, and an intermediate elongated frusto-conical section G, the function of which will be hereinafter set forth.

H represents a complementary section arranged in axial alinement with the member D, formed with an externally threaded head I and an internally threaded tubular portion J.

K designates a coupling, in the form of a sleeve uniting the parts, insulated from the upper section, and having an internal thread M formed within its lower end engaging the external thread upon the lower coupling or joint member.

It is desirable in joints or couplings of the character described to provide an interlocking engagement between the axially alining members, first to permit of the rotation of either of the members in screwing the coupling upon the gas pipe without relative movement of the other, which allows the application of a wrench upon the outer section or coupling member when it is inconvenient to apply the tool to the complementary member; and, secondly, to prevent the insulation between the members from being injured. It is also desirable to employ as the insulating material sheets of mica, which is the most satisfactory and effective in use, and to permit of the use of such material I provide a peculiar form of joint betwen the parts which will allow the mica to lie flat in sheet form, thus preventing its breaking or cracking.

The meeting faces upon the heads of the sections D and H are formed flat, as shown in Figs. 2 and 3, designated by the reference letters O and P, and are arranged in planes oblique to the longitudinal axis of the coupling, as plainly shown in Fig. 1. This angular facing of the heads prevents—when the parts are assembled—independent rotation between the members, and at the same time affords a flat surface upon which the mica sheet may rest.

Q represents the insulation referred to, extending marginally beyond the head F, the latter being of less diameter than the head I, so as to guard against contact between its periphery and the coupling sleeve.

R represents insulation material, preferably a mica washer, interposed between the tapered portion S of the coupling sleeve and a correspondingly tapered or conical surface G on the member D.

The insulations described properly insulate the electric fixture from the supporting conduit, while the layer of insulating material Q serves, in addition, to seal the pipe and prevent the escape of gas.

From the foregoing description, it will be readily seen that in assembling the parts the coupling sleeve K which unites the joint members is self-centering, by reason of its tapered end portion and the frusto-conical surface that this tapered portion engages. Thus, the depending internally threaded portion of the sleeve is properly positioned in relation to the head section F of the member D, so as to leave a sufficient annular space F' to guard against contact between the sleeve and the head and the resulting short circuit.

Within the space F' referred to may be placed ground mica, or other insulating material, if desired; also, I preferably make the thread M of the coupling sleeve a left-hand thread, so that in applying the coupling to the conduit the rotation of the latter by the application of the wrench or other tool to the coupling sleeve will have a tendency to more tightly clamp the coupling members together upon the insulating material.

In Fig. 4 I have illustrated the form of joint or coupling designed for combination work. This construction is similar to that already described, with the exception that the mica insulation between the coupling members is apertured, as at A', to permit of the flow of the gas into the fixture.

What I claim as my invention is,—

1. An insulation joint for electric fixtures, comprising a headed tubular section adapted to be screwed upon a gas pipe, a similar section in axial alinement with the first-mentioned section, the section heads adjoining and having flat meeting faces oblique to the longitudinal axis of the joint and insulated one from the other, and a coupling uniting the sections and insulated from the section connecting with the gas pipe.

2. An insulation joint or coupling, comprising complementary tubular headed members arranged in axial alinement with the heads adjoining and insulated one from the other, an elongated frusto-conical surface upon one of the members immediately adjacent to its head, a self-centering coupling sleeve having a tapered portion embracing the frusto-conical section, and an internally threaded end screwed upon the head of the adjoining section, and insulating material between the frusto-conical section and the tapered portion of the sleeve.

3. In an insulation joint or coupling for electric fixtures, the combination with a tubular member internally screw-threaded at one end to engage a gas pipe, terminating in a cylindrical head at the other, and formed intermediate its ends with an external frusto-conical section, a second tubular member adjacent to and axially alining with the first, the meeting portions or faces of the members extending in oblique angular relation to the longitudinal axis of the coupling, a flat layer of mica interposed between the meeting faces, insulating the members and sealing the gas pipe, a coupling sleeve having a screw-threaded engagement with said second member, and a tapered portion corresponding in configuration to the frusto-conical section on the first mentioned coupling member, and insulating material interposed between the tapered portion of the sleeve and the adjoining conical portion of the coupling member.

In testimony whereof I affix my signature in presence of two witnesses.

ANDREW McLEAN.

Witnesses:
NELLIE KINSELLA,
W. J. BELKNAP.